United States Patent
Astely et al.

(10) Patent No.: US 8,509,122 B2
(45) Date of Patent: *Aug. 13, 2013

(54) METHOD AND A DEVICE FOR ENHANCED PERFORMANCE IN A CELLULAR WIRELESS TDD SYSTEM

(75) Inventors: David Astely, Bromma (SE); Hannes Ekström, Stockholm (SE); Alireza Nejatian, Uppsala (SE); Per Skillermark, Stockholm (SE); Tobias Tynderfeldt, Solna (SE); Erik Lars Westerberg, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 394 days.

This patent is subject to a terminal disclaimer.

(21) Appl. No.: 12/523,134

(22) PCT Filed: Jan. 16, 2007

(86) PCT No.: PCT/SE2007/050021
§ 371 (c)(1),
(2), (4) Date: Jul. 14, 2009

(87) PCT Pub. No.: WO2008/088255
PCT Pub. Date: Jul. 24, 2008

(65) Prior Publication Data
US 2010/0097963 A1    Apr. 22, 2010

(51) Int. Cl.
| H04L 5/14 | (2006.01) |
| H04J 3/00 | (2006.01) |
| H04J 3/06 | (2006.01) |
| H04L 12/26 | (2006.01) |
| H04L 12/56 | (2006.01) |

(52) U.S. Cl.
USPC ......... 370/276; 370/345; 370/395.4; 370/503

(58) Field of Classification Search
USPC ................. 370/276, 277, 278, 280, 282, 345, 370/347, 395.4
See application file for complete search history.

(56) References Cited

U.S. PATENT DOCUMENTS

| 5,689,502 A | 11/1997 | Scott |
| 6,031,827 A * | 2/2000 | Rikkinen et al. ............... 370/330 |

(Continued)

FOREIGN PATENT DOCUMENTS

| CN | 1358039 A | 7/2002 |
| CN | 1592147 A | 3/2005 |

(Continued)

OTHER PUBLICATIONS

Mitsubishi Electric: "Idle Period Shortening for Half Duplex Communications in Large Cells," XP003019664, TSG RAN WG1, San Diego, California, Oct. 10-14, 2005; R1-051180.

*Primary Examiner* — X. Wong
(74) *Attorney, Agent, or Firm* — Coats & Bennett, P.L.L.C.

(57) ABSTRACT

The invention discloses a method (800) for use in a cellular wireless system (100) with a base station (120), a cell (110) in the system and a first user terminal (130) which can be scheduled for receiving traffic from the base station during a down link period, and for transmitting traffic to the base station during an up link period. There is a first guard period (TUD) between the up link period and the down link period, and a second guard period (TDU) between the down link period and the up link period. The method (800) comprises measuring the interference level in the cell for part of the time between two consecutive down link periods, and varying at least one of the following in accordance with the measured interference level: the duration of the first or second guard period, the duration of the up link period, or the traffic sent in the up link period.

23 Claims, 8 Drawing Sheets

(56) References Cited

U.S. PATENT DOCUMENTS

| | | | |
|---|---|---|---|
| 6,347,113 B1* | 2/2002 | Hatch | 375/149 |
| 2002/0015393 A1* | 2/2002 | Pan et al. | 370/335 |
| 2002/0071415 A1* | 6/2002 | Soulabail et al. | 370/337 |
| 2003/0026215 A1 | 2/2003 | Schafer | |
| 2003/0142649 A1* | 7/2003 | Taniguchi | 370/336 |
| 2006/0068715 A1* | 3/2006 | Hundal et al. | 455/67.11 |
| 2008/0080448 A1* | 4/2008 | Rottinghaus | 370/342 |
| 2008/0248796 A1* | 10/2008 | Oh et al. | 455/423 |
| 2010/0097964 A1* | 4/2010 | Astely et al. | 370/280 |

FOREIGN PATENT DOCUMENTS

| | | |
|---|---|---|
| EP | 1511190 A1 | 3/2005 |
| EP | 1619814 A1 | 1/2006 |
| WO | 97/32444 | 9/1997 |
| WO | 02/09312 A1 | 1/2002 |
| WO | 03/043237 A1 | 5/2003 |
| WO | 2004/004140 A2 | 1/2004 |

* cited by examiner

METHOD AND A DEVICE FOR ENHANCED PERFORMANCE IN A CELLULAR WIRELESS TDD SYSTEM

TECHNICAL FIELD

The present invention relates to a method for use in a cellular wireless access system with at least one base station which controls the traffic to and from a cell in the system. The cell is able to accommodate at least a first user terminal, which can be scheduled for receiving traffic from the base station during a first time period, the so called down link period, and which can also be scheduled for transmitting traffic to the base station during a second time period, the so called up link period.

In the system in which the invention may be applied, there is a first guard period at the transition from the up link period to the down link period, and a second guard period at the transition from the down link period to the up link period.

BACKGROUND

In future cellular wireless access systems, as well as in some contemporary systems, a principle which may be used is the so called TDD principle, Time Division Duplex. In TDD systems, transmissions from the base stations to the user terminals in the cells, the "down link", as well as transmissions from the user terminals to the base stations, the "up link", are carried out on the same frequency, but with a division in time.

Due to the principle employed, in a TDD system there may be interference between uplink and downlink, as they are located on the same frequency. Thus, for example, a user terminal transmitting uplink to a base station may cause interference in another user terminal which is receiving in the downlink.

Similarly, a base station transmitting in the downlink to a user terminal may cause interference in another base station which is receiving traffic in the uplink. Such interference from other base stations may be very high, especially when there is line-of-sight between the base stations. Similarly, two terminals may be very close to each other, which is another case in which there may be very high interference.

One known way of addressing this problem is to synchronize and coordinate all base stations in the system so that all uplink and downlink periods occur simultaneously in all cells within the same area.

Additionally, so called "guard periods" may be inserted between up link and down link periods. Typically, the guard time at the transition from downlink to uplink is chosen to match the sum of the maximum roundtrip propagation delay in a cell and the time it takes for a terminal to switch from reception to transmission. Thus, due to the propagation delay, there is a delay before the terminal can receive the downlink data. In addition, the transmission timing can be controlled so that the terminal will start its transmission earlier to compensate for the propagation delay, in order for the data to be received within the uplink window at the base station.

The guard period at the transition from uplink to downlink, on the other hand, is typically chosen to match the time it takes for the base station to switch from reception to transmission, and the time it takes for a user terminal to switch from transmission to reception. Typically, the guard periods are given by a standard, or defined in the system profile, as is the case in some systems.

Thus, as described above, guard periods are chosen based on the propagation delays within the cell to avoid interference between uplink and downlink, and to allow the terminals to use consecutive uplink and downlink periods for transmission, and to allow the base station and the terminals to switch between uplink and downlink.

In the case that the guard periods are fixed, they are chosen when designing the system, and the same guard periods are used in all cells. If the guard periods are variable, they may be configurable in accordance to, for example, cell size.

However, despite the fact that the cells are synchronized, there may be high levels of base station to base station interference at the beginning or end of the uplink periods due to interference from distant base stations that are still on the air due to propagation delays, as well as interference from close base stations which due to synchronization errors start downlink transmission too early. Antenna down tilt and power control can be used to reduce the interference level, which however may come at the cost of reduced system performance.

Another way of addressing the problem of interference might be to introduce some form of channel coding. However, since the interference levels may be very high, both the radio frequency front-end of the base station, as well as the automatic gain control functions and the base band signal processing which performs demodulation need to be more advanced if the effects of RBS-RBS interference is to be addressed in this way.

Thus the guard times could be chosen not only based on the propagation delays within the cell, but also taking into account the propagation delays to base stations that can be "heard", as well as synchronization errors. However, the required overhead in terms of guard periods may be difficult to determine for this, and for a worst case design, the overhead is applied to all cells in the network, despite the fact that all cells may not suffer from this base station to base station interference problem.

SUMMARY

In conclusion, as described above, there is a need for a solution by means of which the effects of interference can be reduced or eliminated in cellular wireless access systems better than known solutions. In particular, the solution should be usable in TDD systems.

Such a solution is provided by the present invention in that it provides a method for use in a cellular wireless access system which comprises at least one base station for the control of traffic to and from a cell in the system, with the cell being able to accommodate at least a first user terminal.

In the system, the first user terminal can be scheduled for receiving traffic from said base station during a first time period, the down link period, and for transmitting traffic to the base station during a second time period, the up link period.

The system uses a first guard period at the transition from the up link period to the down link period, and a second guard period at the transition from the down link period to the up link period.

The method of the invention comprises the step of measuring the interference level in the cell during at least a part of the time between two consecutive down link periods, and also comprises the step of varying at least one of the following in accordance with the measured interference level:
the duration of the first guard period,
the duration of the second guard period,
the duration of the up link period,
the traffic sent in the up link period.

The traffic in the up link period may or may not comprise slots, but the traffic in the up link period will in both of hose cases (with or without slots) comprise a combination of the following signals:
- data signals
- control signals
- reference signals According to the method of the invention, the varying of the traffic sent in the up link period is carried out by varying the proportion, output power, duration and order of said signals within the up link period, and in the slots, if slots are used.

Also, suitably, the varying mentioned above is carried out whilst maintaining a constant sum of the first guard period, the second guard period, and the up link period.

Thus, by means of the invention, interference can be handled in a "distributed" way. Using the present invention, a "victim" cell can adjust the up link transmission parameters, thereby improving performance within its own cell.

In one embodiment of the invention, the varying mentioned above is carried out by increasing or decreasing the duration of one of the guard periods at the expense of the other guard period. Conversely, in another embodiment of the invention, the varying is carried out by increasing or decreasing the duration of one of the guard periods while maintaining the length of the other guard period.

The varying of the duration of the up link period which is mentioned above may be carried out by decreasing the up link period, whereby the total guard time may be increased.

Conversely, the up link period may be varied by increasing it, so that the total guard time may be decreased.

In yet another embodiment of the invention, the traffic sent in the up link period may be varied by altering the order of the traffic sent in the up link period, so that a higher degree of robustness is achieved.

The invention also discloses a radio base station which functions according to the invention.

BRIEF DESCRIPTION OF THE DRAWINGS

The invention will be described in more detail in the following, with reference to the appended drawings, in which.

DETAILED DESCRIPTION

Figure 1:
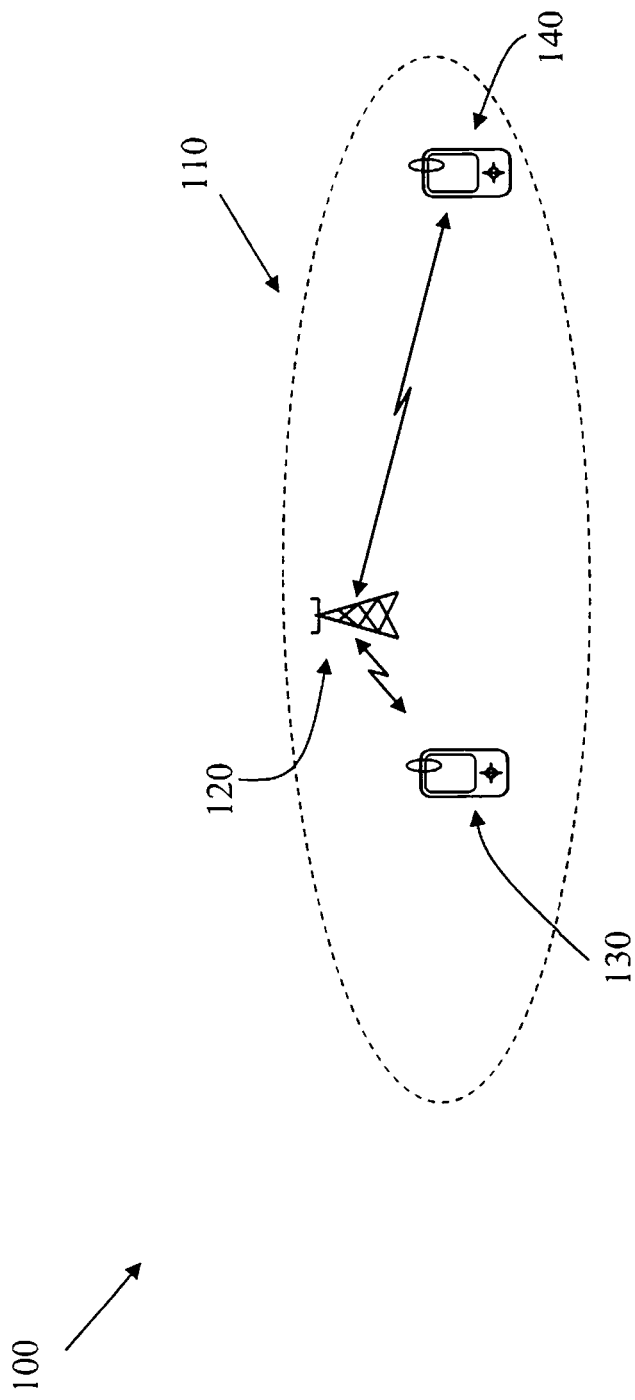
FIG. 1 shows an example of a system in which the invention may be applied.

FIG. 1 shows an example of a wireless access system 100 in which the invention may be applied. The system 100 shown in FIG. 1 is a cellular wireless system, and as such comprises a number of cells, one of which is shown in FIG. 1 with the reference number 110. It should be pointed out that although the system which is shown in FIG. 1 and in the description below, as well, as in some of the other drawings is a cellular wireless system, this is not intended to restrict the scope of protection afforded by this patent application, but is merely to be seen as an example intended to facilitate the reader's understanding of the invention. The invention may equally well be applied to other kinds of wireless access systems.

The cell 110 comprises at least one radio base station, an RBS, shown as 120 in FIG. 1. The RBS 120 serves, inter alia, to control the traffic to and from users in the cell 110. The cell 110 can accommodate at least one user terminal, a UE, and in FIG. 1 there are two user terminals shown, with the reference numbers 130 and 140.

The system 100 for which the invention is intended is one in which communication to the UEs 130, 140, from the RBS 120 can be scheduled to take place during a first period in time, usually referred to as the down link period, DL, and the traffic from the UEs 130, 140, to the RBS 110 can be scheduled to take place during a second period in time, referred to as the up link period, UL.

The invention is especially suitable for a so called TDD system, in which the UL and the DL transmit on the same frequency but are separated in time.

Figure 2:
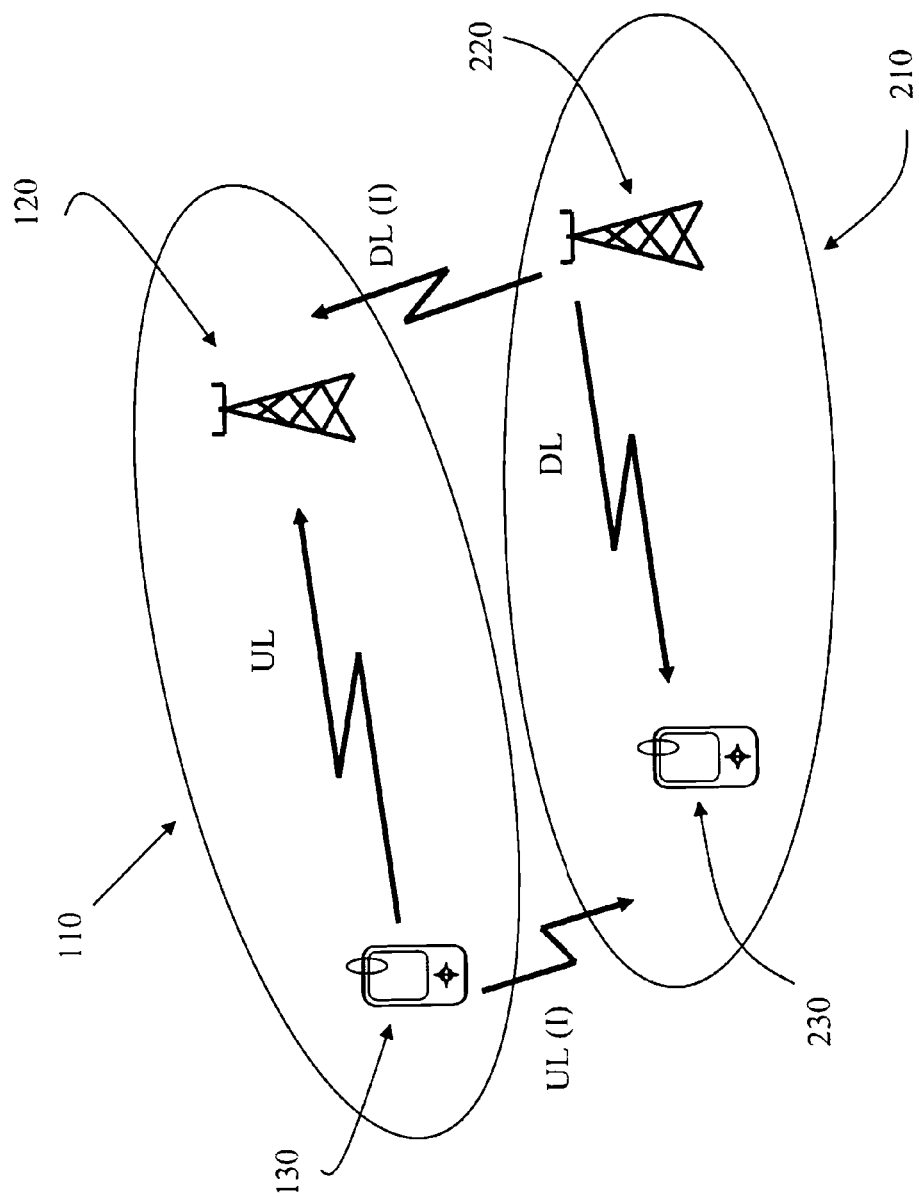
FIG. 2 shows a problem which the invention intends to address.

A problem which may become bothersome in TDD systems is interference between uplink and downlink, which FIG. 2 attempts to illustrate: FIG. 2 shows the cell 110 of FIG. 1, and an adjacent cell 210. Each of the cells 110, 210, contains a radio base station, RBS, 120 in the cell 110 and 220 in the cell 210. In the cell 110, there is shown one user terminal 130, UE, and in the cell 210 there is one UE 230, also shown in FIG. 2.

The system in which the cells 110, 210, are used is a cellular telephony system which uses the so called TDD principle to separate the up link from the down link. In the following, the invention will be described using such a system in the drawings as well as in the description, but it should be understood that this is by way of example only, the invention can be applied in other kinds of systems as well.

With renewed reference to FIG. 2, there may be inter-cell interference between UL and DL, since they, according to the TDD principle, are transmitted on the same frequency. This is illustrated in FIG. 2, in which the cell 110 is in its UL mode and the cell 210 is in its DL mode, which is illustrated by means of arrows between the UEs 130, 230, and their RBSs 120, 220.

Thus, since the RBS 120 is in UL mode, signals which are transmitted from the adjacent RBS 220 which is in DL mode may interfere with the reception of the signals from the UE 130 at the RBS 120. This is shown in FIG. 2 by means of an arrow DL (I) from the RBS 220 to the RBS 120.

In addition, since the UE 230 is in DL mode, signals transmitted from the UE 130 which is in UL mode may cause interference at the UE 230, which is shown with an arrow UL (I) from the UE 130 to the UE 230.

In FIG. 2, it is inter-cell interference between UL and DL that is illustrated. It should, however, be pointed out that interference between UL and DL may also occur between UEs in the same cell.

Figure 3:
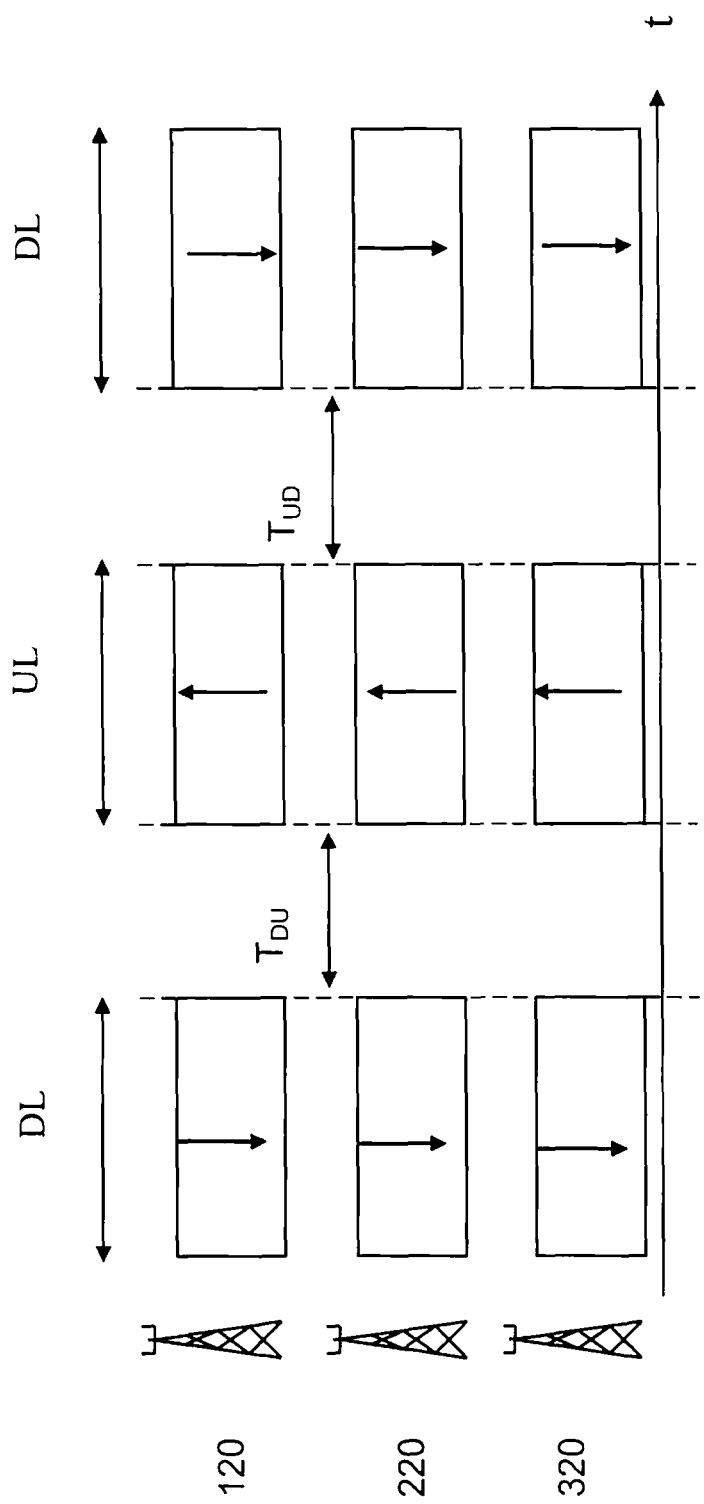
FIG. 3 shows an example of a prior art solution.

A known method of solving this problem is to synchronize and coordinate the base stations in the system, so that all uplink and downlink periods occur simultaneously in all cells within the same geographic area. This is depicted in FIG. 3 which shows the timing for three RBSs, the two 120, 220, from FIG. 2 as well as an additional RBS 320. The up link period is indicated as UL in FIG. 3, and the down link period is indicated as DL in FIG. 3.

Also shown in FIG. 3 is the fact that so called "guard periods" may be inserted at the transition between UL and DL, these periods being shown as $T_{UD}$ in FIG. 3, and also at the transition from DL to UL, referred to as $T_{DU}$.

The guard periods $T_{UD}$ and $T_{DU}$ are not chosen in the same manner: Typically, the guard time at a switch from downlink to uplink, $T_{DU}$, is chosen to match the sum of the maximum roundtrip propagation delay in the cell and the time it takes for a UE to switch from reception to transmission. The transmission timing may be controlled so that a UE with long propagation time to the RBS starts its transmission to the RBS earlier than other UEs to compensate for the propagation delay, in order for all traffic from the UEs to be received within the uplink window at the RBS.

The guard period at the switch from uplink and downlink, $T_{UD}$, on the other hand, is usually chosen to match the time it takes for the base station to switch from reception to transmission, and the time it takes for a (nearby) terminal to switch from transmission to reception.

A problem which could be not be addressed by choosing the guard periods $T_{DU}$ and $T_{UD}$ in the way described above is inter-cell interference between RBSs. Instead of choosing the guard periods with respect only to the propagation delays within a cell, propagation delays and synchronization accuracy of base stations that can be heard needs to be considered. However, the required guard periods for this purpose may be hard determine in advance, and choosing them in accordance to a worst case scenario may lead to large overhead in all cells despite the fact that it may just be a problem in certain cells.

Thus, a basic idea behind the invention is to measure the interference level during at least part of the time between two consecutive DL periods in a cell, and using the measured interference level as a basis for varying at least one of the following in the cell according to the measured interference:
    the duration of the guard period $T_{DU}$,
    the duration of the guard period $T_{UD}$,
    the duration of the up link period,
    the traffic sent in the UL period.

These parameters, and how they are varied, will be described in more detail in the following.

The interference level in the cell, as will be described in more detail in the following, can be measured in the entire interval between two consecutive DL periods, or in all or part of one of the guard periods, or in all or part of the UL period, or in a combination of these periods. Interference, and possibly also how the interference varies as a function of time, may accordingly be measured during the period between two consecutive downlink periods, and averaged over a number of such periods, if desired. Thus, past interference measurements may be used to adapt the guard periods between any two consecutive downlink periods.

Suitably, the varying of the duration of the periods mentioned above is carried out whilst maintaining a constant sum of the guard period $T_{UD}$, the guard period $T_{DU}$, and the up link period, but it is entirely possible to increase or decrease the sum if that is allowed by the system in which the invention is applied.

Also, the varying may be carried out by increasing or decreasing the duration of one of the guard periods at the expense of the other guard period, or, alternatively, the varying can be carried out by increasing or decreasing the duration of one of the guard periods while maintaining the length of the other guard period.

The duration of the up link period may be varied by decreasing it, so that the total guard time $T_{DU}+T_{UD}$ may be increased, or by increasing it, so that the total guard time may be decreased.

Suitably, the measurements as well as the varying of one of the parameters given above are carried out by measurement means and varying means in the RBS, although it also conceivable to let them be carried out by separate such means outside of the RBS. The measurements could for example be carried out by measuring stations which would then communicate the results of the measurements to the RBS for further actions. Also, the measurements could be carried out by a function in the UEs, and the results would then be communicated to the system for further actions.

Similarly, the varying could be decided upon by special means for this outside of the RBS.

However, in a preferred embodiment, both the measurements and the varying of one or more of the parameters listed above are carried out by functions for this in the RBS.

The control signals by means of which the varying is communicated to the UEs in the cell of the RBS can be communicated to the UEs in various ways, but suitably the varying is controlled by the RBS by means of transmitting control signals to the UEs in the cell on a broadcast channel to all UEs in the cell, or the control signalling can be done on an individual basis for each UE.

Figure 4:
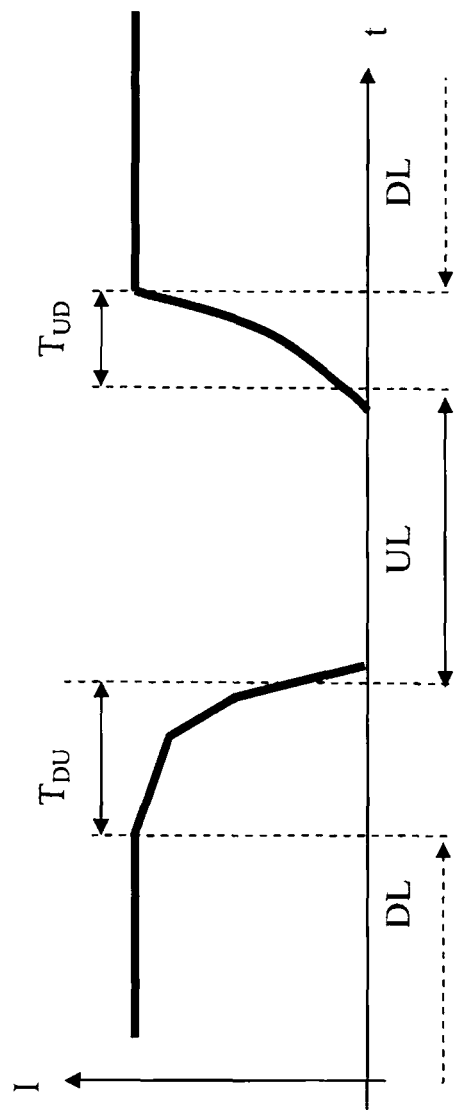
FIG. 4 shows another view of the problem which the invention intends to address.

FIG. 4 illustrates some basic concepts of the invention: Interference at the base station is shown as/on the vertical axis as a function of time, t.

As is also shown in FIG. 4 (as well as in FIG. 3), the time between two consecutive downlink periods comprises three components: the uplink period UL, during which data is sent to the RBS from the UE, and on either side of the uplink period UL there are the guard periods mentioned previously, i.e. $T_{DU}$ and $T_{UE}$).

The measuring means, suitably located in the RBS, will measure the interference level, and suitably also its variation over time, in some part of the period between two consecutive DL periods, preferably by averaging measurements from several time periods between consecutive DL periods.

In accordance with the specific interference I measured between two consecutive downlink periods, a number of steps may be taken. These steps will, according to the invention, involve varying one of the following in accordance with the measured interference, if the interference is above a certain threshold:
    the duration of the guard period $T_{DU}$,
    the duration of the guard period $T_{UD}$,
    the duration of the up link period,
    the traffic sent in the up link period.

The comparison with the threshold mentioned above can be carried out in a number of ways, for example:
 1. Absolute, i.e. the check will be if the measured interference exceeds a certain level in at least a part of the time between two consecutive downlink periods.
 2. Relative, i.e. the check will be if the measured interference is, for example, five times higher in one part of the time between two consecutive downlink periods than the average interference level in the period.
 3. A combination of 1) and 2) above.

Thus, the varying of the parameters above may be such that one of the guard periods $T_{DU}$ or $T_{UD}$ is increased or decreased at the expense of the other guard period. In this way, if the interference is particularly bothersome at one of the ends of the UL period, while the interference at the other end of the UL period is not a problem, the guard period at the "bothersome" end of the UL period may be increased at the expense of the guard period at the other end of the UL period, so that the total guard time $T_{DU}+T_{UD}$ is maintained. This will thus also entail moving the UL period, depending on the interference level. This may be done by controlling the transmission timing of the UE, also commonly referred to as timing advance or time alignment of the terminal.

In another embodiment of the invention, the varying is carried out by increasing or decreasing one of the guard periods $T_{DU}$ or $T_{UD}$ while maintaining the length of the other guard period. In such an embodiment, the UL period shown in FIG. 4 may be increased or decreased.

Also, in a further embodiment of the invention, the duration of the UL period is varied by decreasing it. In this way, the total guard time may be increased, which makes it possible to increase one or both of the guard periods $T_{DU}/T_{DU}$. This version of the invention can be employed if there is a high degree of interference I at both ends of the UL period.

Conversely, if the interference level I is low at both ends of the UL period, the UL period may be varied by increasing it, since the total guard time $T_{DU}+T_{UD}$ may be decreased, and more data may thus be transmitted in the UL period.

Another way of countering high levels of interference I is to vary the traffic sent in the up link period, so that a higher degree of robustness is achieved. Before describing this possibility, a short explanation will be given of how traffic is sent in the UL period in one embodiment: the UL period may be divided into one or more so called slots, and each slot may contain a combination of one or more of data, control, and reference signals. The invention will in the following be described with reference to the use of slots in the UL, but it should be pointed out that this is by way of example only, the invention may equally well be applied in an embodiment without the use of such slots.

The embodiment which entails varying the traffic sent in the UL period utilizes the fact that these different signals may be comprised in the slots of the UL. Naturally, the same principle may be followed in a version without slots.

The different signals, i.e. data, control and reference signals, may exhibit different degrees of tolerance to interference, and may thus be more or less suitable for positioning at an end of the UL period in which there is a high level of interference.

Accordingly, the invention discloses that the varying of the traffic in the UL may be carried out by varying the proportion, output power and order within the up link period of said signals. Suitably, these variations are carried out on a "slot basis", in other words the proportion of a slot that is used for each of the type of signals may be varied, as can the output power used when transmitting the different signal types within one and the same slot, as well as the order of the various types of signals in the slot.

If, for example, control signals are deemed to be particularly sensitive to interference or particularly important for system performance, they may be placed at a "safe" position within the UL slot, and conversely, parts which contain signals which are less crucial to system performance may be placed at positions within the UL slot that are more exposed to interference.

Also, if one end of an UL slot is particularly exposed to interference, empty periods may be inserted at that end of the UL slot. The slot then contains an "extra" guard period in which no signal is transmitted, and this will increase the total effective guard period.

Typically, as mentioned above, the uplink period contains several slots, and the formats of the different slots may be changed independently. For example, only the format of the first or the last slot of the uplink period may need to be changed.

With the freedom given by the combination of alternatives above, the invention will provide a rather fine granularity with which the duration of the total guard period can be controlled.

Figure 5:
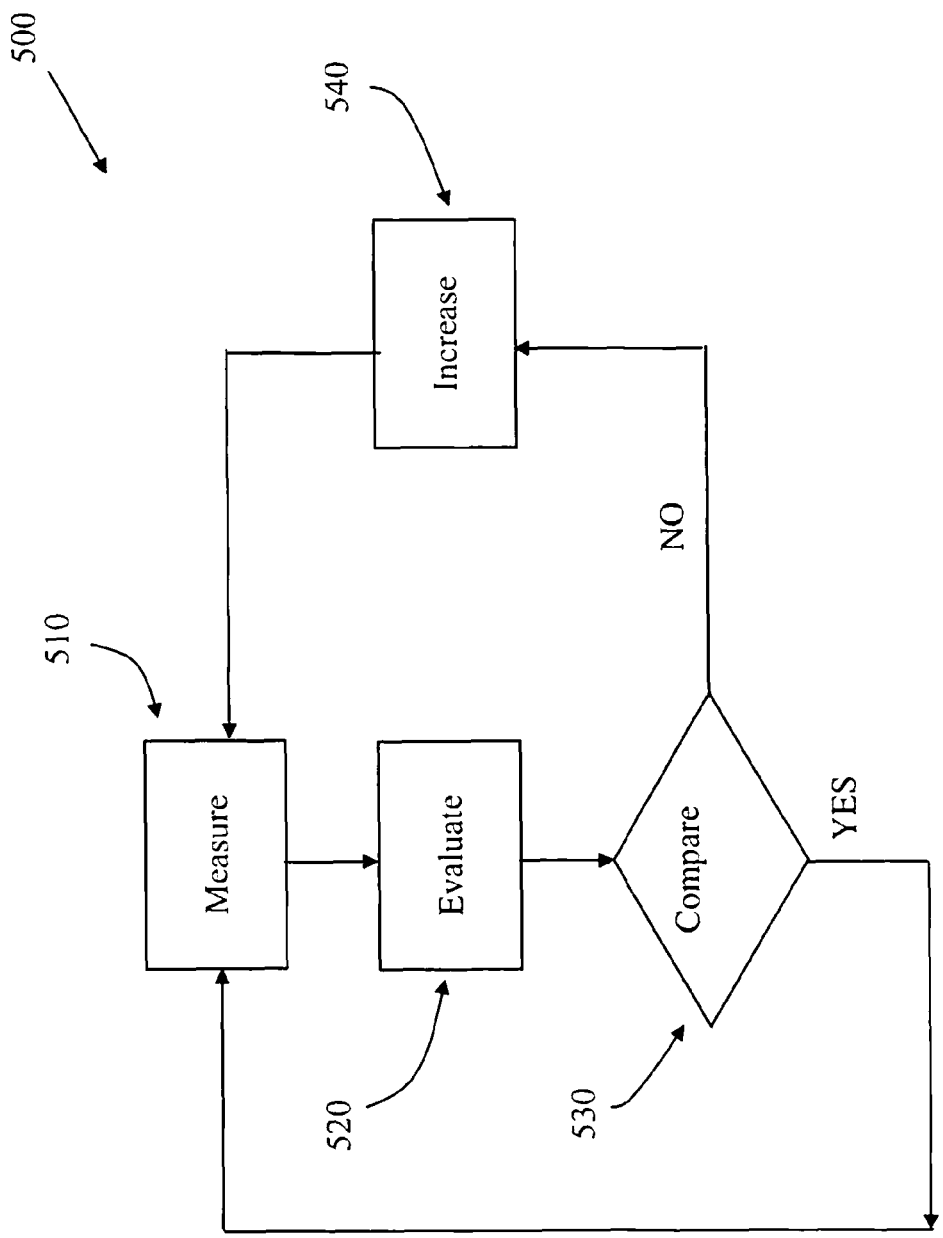
FIGS. 5 and 6 show flow charts of some steps of a method of the invention.
Figure 6:
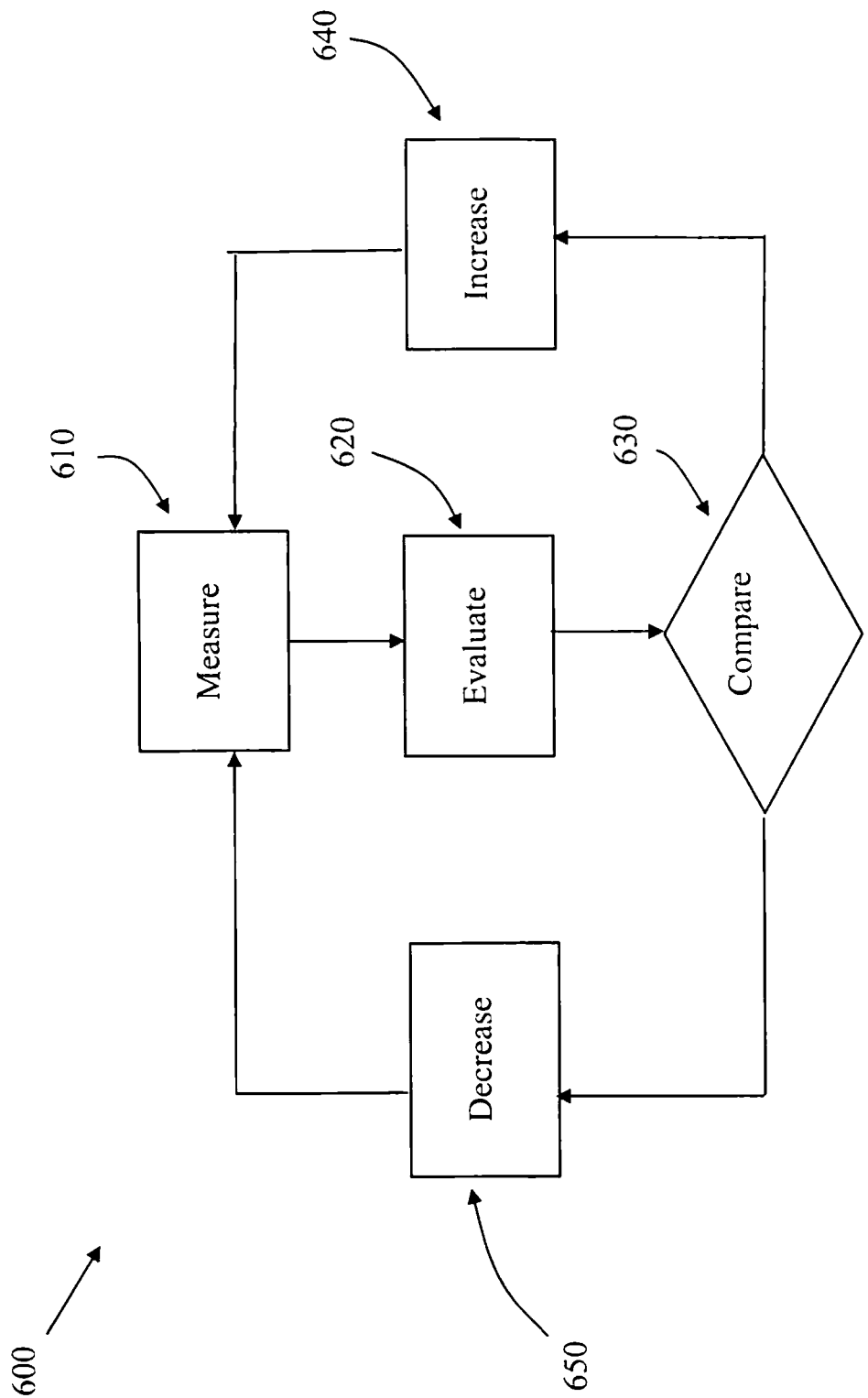

Returning now to the measurements of the interference level carried out according to the invention, FIGS. 5-6 illustrate some possible methods for this.

In the flowchart 500 shown in FIG. 5, measurements of the interference level in at least part of the period between two consecutive DL periods are carried out, block 510, possibly over several periods and averaged. The measured interference can then be evaluated, particularly at the start and/or end of the UL period, block 520. The evaluation of the interference may preferably be carried out as described above in connection with FIG. 4, i.e. absolute, relative, or a combination of those.

The measured interference level is then compared to a threshold, block 530. If the level is below the threshold, the procedure starts again, block 510, either immediately, or after a certain pause period. If, on the other hand, the level is above the threshold, the guard period before or after the UL period is increased, block 540, and the length of the UL period may be adjusted accordingly, following which the procedure may be repeated, block 510.

With regard to the "thresholding" described above, it should be mentioned that other forms of processing of the interference measurements are conceivable as well, which forms would also account for how the interference varies with time. For example, based on the interference measurements, performance parameters such as BER, BLER and throughput may be evaluated for different slot formats. Additionally, other measurements such as, for example, the total received power at the RBS can be used as an indication of the interference level.

A version of this is shown in the flow chart 600 in FIG. 6: In block 610, the interference level is measured. The measured interference level in the UL may then be evaluated, particularly the interference at the start and/or end of the UL period, block 620. The measured interference, for example at the start or end of the UL period is then compared to a threshold, block 630. This "thresholding" may suitably be carried out as described previously in connection with FIGS. 4 and 5.

If the interference level is below the threshold, one or both of the guard periods $T_{DU}$, $T_{UD}$ may be decreased, block 650, allowing for an increase of the UL period, and the procedure then starts again, block 610, either immediately, or following a certain period in time.

If, on the other hand, the interference level is above the threshold, one or both of the guard periods $T_{DU}$, $T_{UD}$ may be increased, block 640, possibly allowing for a decrease of the UL period, and the procedure then starts again, block 610, either immediately or following a certain period in time.

It can be mentioned here that the interference level may be measured in a number of ways: either the interference level can be measured directly, or indirectly by measuring system performance in the UL, such as for example throughput and/or bit error rate of different slots, or the total signal power received by the RBS in the UL.

Figure 7:
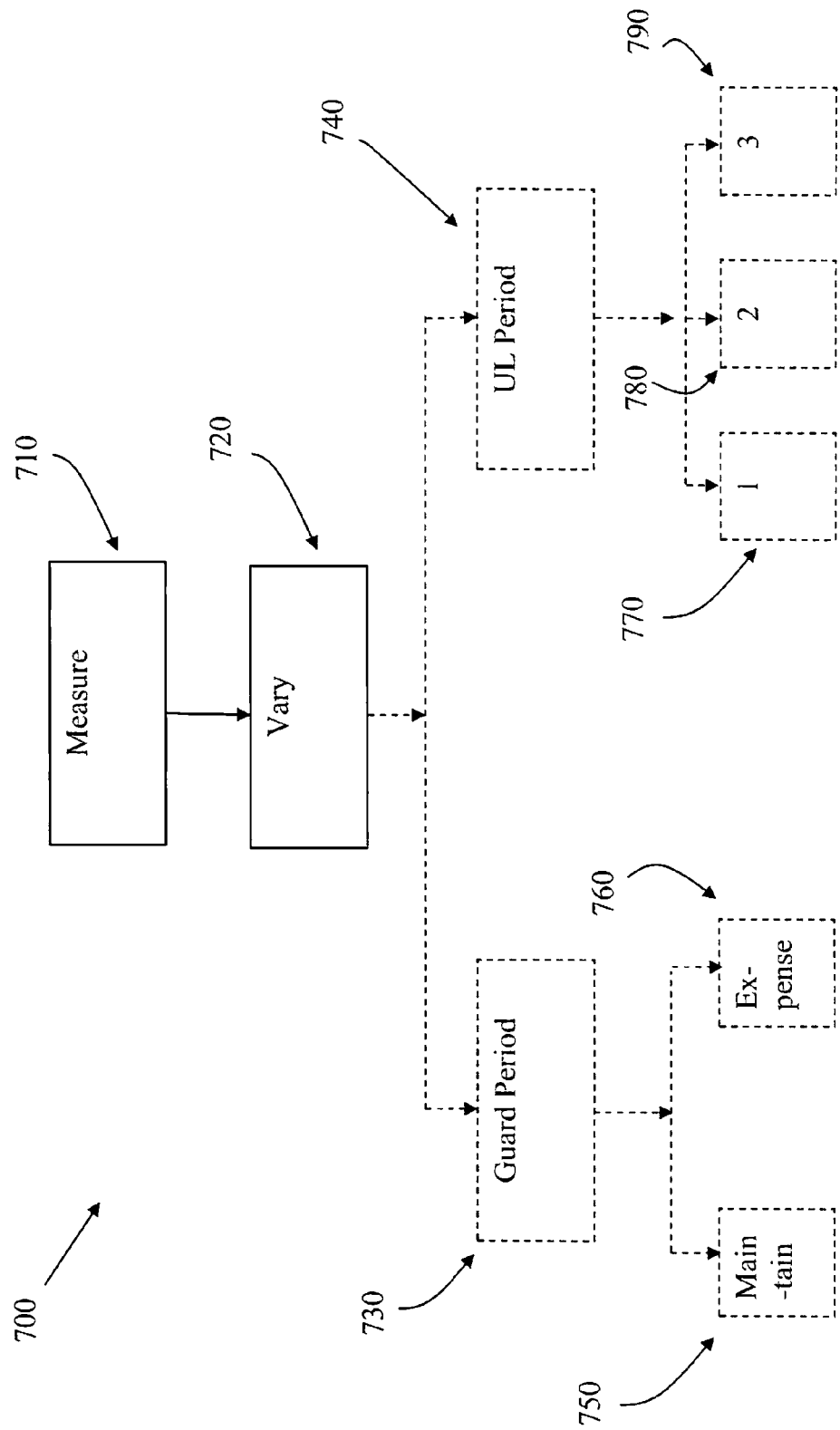
FIG. 7 shows a flow chart with an overview of the invention.

FIG. 7 shows a flow chart 700 which is an overview of a method of the invention. Steps which are options or alternatives are shown with dashed lines. The description will only be brief, since the method has already been described above.

In block 710, the interference level in the up link traffic in the cell in all or part of the period between two consecutive DL periods is measured, and in block 720, at least one of the following is varied in accordance with the measured interference level:
   the duration of the guard period $T_{DU}$, block 730.
   the duration of the guard period $T_{UD}$, block 730
   the duration of the up link period, block 740,
   the traffic sent in the UL period.

The guard periods $T_{DU}$ and or $T_{UD}$ can be varied by increasing or decreasing one of the guard periods at the expense of the other guard period, block 760, or whilst maintaining the length of the other guard period, block 750 whilst varying the duration of the UL period, if the total time is to be kept constant.

If it is the duration of the UL period that is to be varied, block 740, this can be done in one of the following ways:
1. The UL period can be varied by decreasing it, whereby the total guard time may be increased, block 770.
2. The UL period can be varied by increasing it, so that the total guard time may be decreased, block 780.

As described previously, the varying of the traffic may be carried out by varying the proportion, output power and order within the up link period of the data signals, control signals and reference signals.

Figure 8:
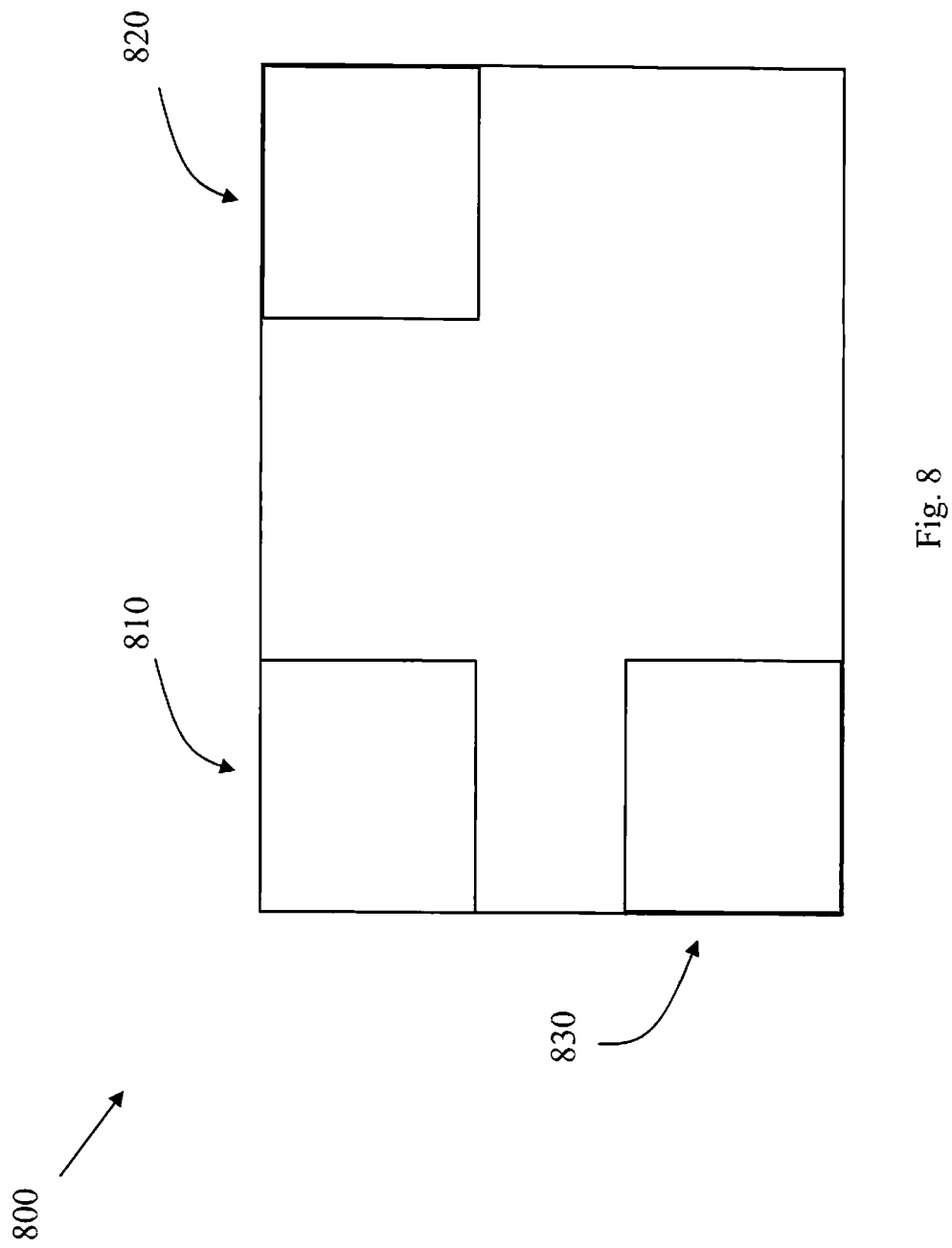
FIG. 8 shows some components in a radio base station of the invention.

Finally, FIG. 8 schematically shows some of the functions available in an RBS 900 of the invention, which will only be described briefly since the functions have been explained above: in an RBS 800 of the invention, there should be means 810 for scheduling at least a first UE for receiving traffic from the base station 800 during the DL period.

The scheduling means 810 should also be able to schedule at least a first UE for transmitting traffic to the RBS 800 during the UL period.

The scheduling means 810 also schedule the guard period $T_{UD}$ at the transition from the up link period to the down link period and the guard period $T_{DU}$ at the transition from the down link period to the up link period.

In addition, the RBS 800 comprises means 820 for measuring the interference level in at least part of the time between two consecutive DL periods, and means 830 for varying at least one of the following in accordance with the measured interference level, as described previously in this text:
the duration of the guard period $T_{DU}$,
the duration of the guard period $T_{UD}$,
the duration of the UL period,
the traffic sent in the UL period.

The invention is not limited to the exemplary embodiments given above, but may freely be varied within the scope of the appended claims.

It should be pointed out that the varying of parameters as described in this text will naturally be within the constraints defined by the system, or, for example, by the system configuration.

The invention claimed is:

1. A method for use in a cellular wireless access system comprising at least one base station for controlling traffic to and from a cell in the system, said cell accommodating at least a first user terminal, in which system said first user terminal is scheduled for receiving traffic from said base station during a first time period, a down link period (DL), and in which system said first user terminal is scheduled for transmitting traffic to said base station during a second time period, an up link period (UL), and in which system there is a first guard period ($T_{UD}$) at the transition from the up link period to the down link period, and a second guard period ($T_{DU}$) at the transition from the down link period to the up link period, said method comprising:
measuring an interference level in the cell during at least a part of the time between two consecutive down link periods; and
varying at least one of the following in accordance with the measured interference level: the duration of said first guard period ($T_{UD}$), the duration of said second guard period ($T_{DU}$), the duration of the up link period, and the traffic sent in the up link period.

2. The method of claim 1, according to which the traffic in the up link period comprises a combination of the following signals: data signals, control signals, and reference signals; and according to which method the varying of the traffic is carried out by varying the proportion, output power, duration and order of said signals within the traffic of the up link period.

3. The method of claim 1, according to which the traffic in the up link period comprises slots, which in turn comprise a combination of the following signals: data signals, control signals, and reference signals; and according to which method the varying of the traffic is carried out by varying the proportion, output power and order of said signals within the slots of the up link period.

4. The method of claim 1, according to which said varying is carried out whilst maintaining a constant sum of the first guard period ($T_{UD}$), the second guard period ($T_{DU}$) and the up link period (UL).

5. The method of claim 1, according to which said varying is carried out by increasing or decreasing the duration of one of said first and second guard periods at the expense of the other guard period.

6. The method of claim 1, according to which said varying is carried out by increasing or decreasing the duration of one of said first or second guard periods while maintaining the length of the other guard period.

7. The method of claim 1, according to which the duration of the up link period is varied by decreasing it, so that the total guard time is increased.

8. The method of claim 1, according to which the duration of the up link period is varied by increasing it, so that the total guard time is decreased.

9. The method of claim 1, according to which the order of the up link traffic is varied by placing sensitive signals away from the edges of the UL period.

10. The method of claim 1, according to which the interference measurements are carried out in at least part of one of: the first guard period ($T_{UD}$), the second guard period ($T_{DU}$), and the up link period.

11. The method of claim 1, according to which the interference measurements are carried out by the base station.

12. The method of claim 1, according to which said varying is carried out by the base station communicating the at least one varied parameter to the first user terminal.

13. A radio base station for the control of traffic to and from a cell in a cellular wireless access system, said cell being accommodating at least a first user terminal, the radio base station comprising:
means for scheduling said first user terminal for receiving traffic from the base station during a first time period, a down link period (DL), and means for scheduling said first user terminal for transmitting traffic to the base station during a second time period, an up link period (UL), and means for scheduling a first guard period ($T_{UD}$) at the transition from the up link period to the down link period and a second guard period ($T_{DU}$) at the transition from the down link period to the up link period;
means for measuring an interference level in the cell during at least part of the time between two consecutive down link periods; and
means for varying at least one of the following in accordance with the measured interference level: the duration of said first guard period ($T_{UD}$), the duration of said second guard period ($T_{DU}$), the duration of the up link period, and the traffic sent in the up link period.

14. The radio base station of claim 13, in which the traffic received from a user terminal in the up link period comprises slots which in turn comprise a combination of the following signals: data signals, control signals, and reference signals; and in which radio base station the varying means vary the proportion, output power and order of said signals within the up link period slots.

15. The radio base station of claim 13, in which the traffic received from a user terminal in the up link period comprises a combination of the following signals: data signals, control signals, and reference signals; and in which radio base station the varying means varies the proportion, output power, duration and order of said signals within the up link traffic.

16. The radio base station of claim 13, in which the varying means carry out the varying whilst maintaining the sum of the first guard period ($T_{UD}$), the second guard period ($T_{DU}$) and the up link period constant.

17. The radio base station claim 13, in which the varying means increase or decrease the duration of one of said first and second guard periods ($T_{UD}$, $T_{DU}$) at the expense of the other guard period ($T_{UD}$, $T_{DU}$).

18. The radio base station of claim 13, in which the varying means increase or decrease the duration of one of said first or second guard periods ($T_{UD}$, $T_{DU}$) while maintaining the length of the other guard period ($T_{UD}$, $T_{DU}$).

19. The radio base station of claim 13, in which the varying means vary the duration of the up link period by decreasing it, whereby the total guard time ($T_{DU}+T_{UD}$) is increased.

20. The radio base station of claim 13, in which the varying means vary the duration of the up link period by increasing it, whereby the total guard time ($T_{DU}+T_{UD}$) is decreased.

21. The radio base station of claim 13, in which the varying means vary the order of the traffic sent in the up link period by placing sensitive signals away from the edges of the UL period.

22. The radio base station of claim 13, in which the measuring means carry out the interference measurements in at least part of one of: the first guard period ($T_{UD}$), the second guard period ($T_{DU}$), and the up link period.

23. The radio base station of claim 13, in which the varying means carry out the varying by signaling the at least one varied parameter to the first user terminal.

\* \* \* \* \*